United States Patent [19]

Braat

[11] Patent Number: 4,872,748
[45] Date of Patent: Oct. 10, 1989

[54] PROJECTION-LENS SYSTEM
[75] Inventor: Josephus J. M. Braat, Eindhoven, Netherlands
[73] Assignee: U.S. Philips Corporation, New York, N.Y.
[21] Appl. No.: 733,567
[22] Filed: May 13, 1985
[30] Foreign Application Priority Data
Feb. 18, 1985 [NL] Netherlands .......................... 8500454
[51] Int. Cl.$^4$ .............................................. G02B 13/18
[52] U.S. Cl. .................................... 350/432; 350/412; 350/474; 350/477
[58] Field of Search ................ 350/432, 412, 474, 477
[56] References Cited
U.S. PATENT DOCUMENTS
4,348,081 9/1982 Betensky .............................. 350/432

FOREIGN PATENT DOCUMENTS
0118616 7/1983 Japan .................................... 350/474

Primary Examiner—Bruce Y. Arnold
Assistant Examiner—Rebecca D. Gass

[57] ABSTRACT

An achromatic temperature-independent projection lens system for projecting a magnified image of a scene reproduced by means of a reproduction-tube, onto a projection screen. The lens system comprises two correction groups and one main group which provides substantially the entire power of the lens system. The main group comprises a cemented doublet of a convex-concave lens and a biconvex lens and has two spheric outer surfaces. The correction groups each comprise one lens whose surface which faces the image is aspheric.

4 Claims, 1 Drawing Sheet

PROJECTION-LENS SYSTEM

BACKGROUND OF THE INVENTION

The invention relates to a projection-lens system or lens for projecting a magnified image of a scene reproduced by means of a reproduction element onto a projection screen. The lens system comprises, in this order and viewed from the image side, a first group having one aspheric surface, a positive second or main group having two spherical convex outer surfaces, and a third group comprising a planoconvex lens whose concave surface which faces the image side is aspheric, the elements of the first group and of the third group being made of a transparent plastics material. The invention also relates to a colour-television projection system provided with at least one projection-lens system of this kind.

Such a projection-lens system or lens is disclosed in the U.S. Pat. No. 4,348,081, which system is used for projecting a scene in one colour onto a projection screen, where superposition of three monochrome images results in a colour picture. The third lens group from the image side is a field-curvature correction lens element, also referred to as "Field flattener", which provides compensation for the Petzval curvature of the two other lens groups. The lens shown in FIG. 1 of U.S. Pat. No. 4,348,081 has a main group comprising one biconvex lens. If this lens element is made of glass, which is a stable material, the focal length, which largely determines the focal length of the entire system, is substantially temperature-independent. The two other groups are made of a transparent plastic which is lighter in weight than glass, so that the weight of the entire projection-lens system remains within acceptable limits despite the fact that the lens elements have comparatively large diameters, for example of the order of 100 mm. Since a part of the power of the entire lens system is provided by the first group and the third group, which are made of a plastic whose refractive index is temperature dependent, the focal length of the entire system is still temperature dependent.

Moreover, the projection-lens system of Pat. No. 4,348,081 provides the desired imaging only for a small range of wavelengths around the central wavelength of the radiation which passes through the system; for radiation in a wider range of wavelengths the picture will not be in focus owing to the variation in focusing as a function of the wavelength. In view of the comparatively large bandwidth of the radiation emitted by the reproduction tubes, in particular the reproduction tube with the green phosphor, it is desirable that in practice an achromatic main lens is used.

SUMMARY OF THE INVENTION

The present invention provides a projection lens system having an achromatic main lens group and which, in addition, has a focal length which is substantially temperature-independent. Further, the projection-lens system can have a smaller focal length and a larger angle of field than comparable known projection-lens systems.

The main group provides substantially the entire power of the lens system and comprises a cemented doublet of a convex-concave lens element and a biconvex lens element, which elements have substantially equal refractive indices and different dispersions.

The system can be designed in such a way that the diameters of the lens elements decrease viewed from the object side. Since in a colour-television projection system the monochrome images are superimposed on the projection screen, the reproduction tubes, which are arranged in-line (side by side), should be inclined relative to one another, i.e. the normals to the two outer reproduction tubes should make a specific angle with the normal to the inner reproduction tube. If the diameters of the lens elements decrease towards the image side so that the projection-lens system has a tapered shape, this angle can be smaller than when conventional projection lens systems are employed. If this angle is small, this is favourable in view of the optical properties of the projection screen.

In accordance with a second aspect of the invention a projection-lens system comprising two discrete correction lens elements each having one aspheric surface and a main group comprising a cemented doublet has a large angle of field and a small focal length and this projection-lens system also has a satisfactory modulation-transfer function (MTF) and an acceptable luminance in the corners of the field.

The angle of field is to be understood to mean the angle between the optical axis of the system and the chief ray of a beam which issues from the edge of an object or scene and which is still accepted by the lens system.

DESCRIPTION OF THE PREFERRED EMBODIMENTS

Figure 1:
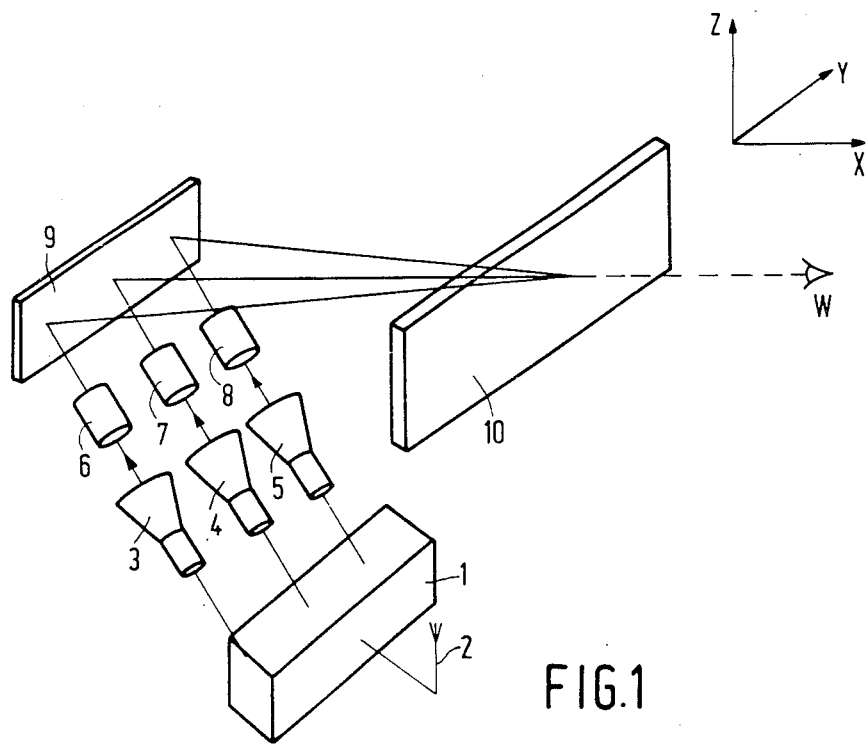
FIG. 1 is a schematic perspective view of a colour-television projection system.

The colour-television projection system shown in FIG. 1 comprises a colour-television receiver 1. An input of this receiver, which is coupled to an aerial 2, receives a colour-television signal which is split into a red signal, a green signal and a blue signal. These signals are applied to three separate reproduction tubes, in the present example three in-line (side by side) cathode-ray tubes 3, 4 and 5, on whose fluorescent screens a red, a green and a blue image appear. The schematically shown projection-lens systems 6, 7 and 8 associated with the reproduction tubes project these images onto a projection screen 10. For the sake of clarity only the chief rays of the beams emitted by the reproduction tubes are shown. A mirror 9, which reflects the obliquely upward beams from the cathode-ray tubes to the projection screen, is arranged between the projection-lens systems and the projection screen. This mirror folds the radiation path, so that the projection system can be accommodated in a cabinet of comparatively small depth, without reducing the length of the radiation path.

The three monochrome images must be superimposed on the projection screen. For this purpose, the reproduction tubes are slightly inclined towards each other, so that the normals to the screens of the tube 3 and 5 make a small angle with the normal to the screen of the tube 4.

In the projection screen 10 the radiation of the three beams is scattered over a comparatively large angle in the Y-direction, i.e. in the horizontal direction for the viewer W, and over a smaller angle in the Z-direction, which is the vertical direction for the viewer. The viewer W sees a picture which is a superposition of the magnified images from the reproduction tubes.

Each of the projection-lens systems 6, 7 and 8 should image the scene on the faceplate EP of the associated reproduction tube onto the projection screen with a high imaging quality, also at the edges of the picture. Such a projection-lens system should have a large numerical aperture and the image distance corresponding to a specific magnification should be as small as possible. The lens elements of the projection-lens system are comparatively large, so that it is desirable to manufacture these lenses from light-weight materials. Further, the number of lens elements should be as small as possible, so that at least some of these elements should have aspheric refractive surfaces in order to ensure that the projection lens system is corrected adequately and has a satisfactory optical transfer function. Moreover, the focal length of the entire projection-lens system should remain as constant as possible in the case of temperature variations. For this purpose, substantially the entire power of the lens system is provided by the main group and this main group comprises a glass lens, whilst the two other groups comprise lenses made of a transparent plastic.

Figure 2:
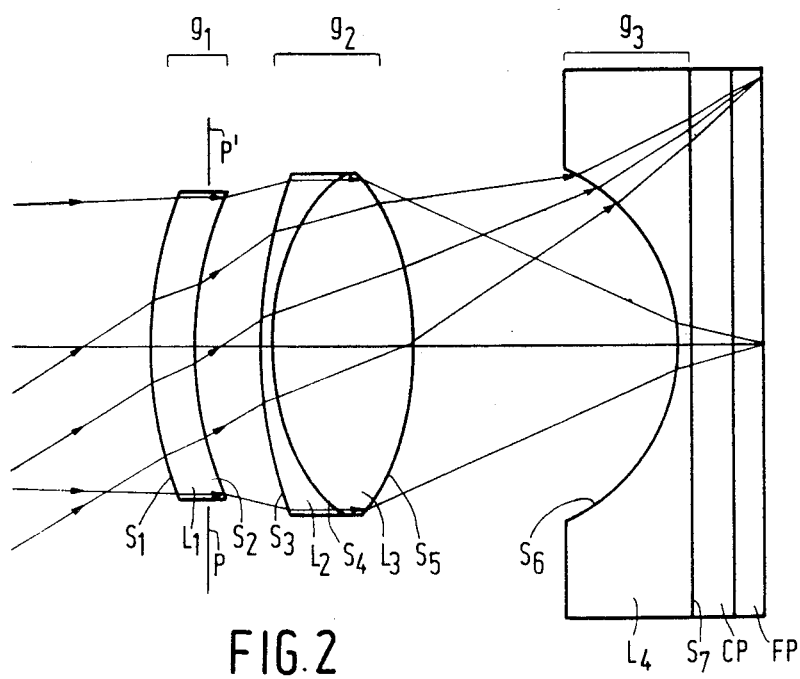
FIG. 2 shows a projection-lens system in accordance with the invention which may be employed in said colour-television projection system.

Referring to FIG. 2, the main group $g_2$ comprises a cemented doublet of a concave-convex lens element $L_2$ having surfaces $S_3$ and $S_4$ and a biconvex lens element $L_3$ having surfaces $S_4$ and $S_5$. The refractive indices of the elements $L_2$ and $L_3$ are equal as far as possible, whilst the dispersions of these elements differ substantially. The lens elements $L_2$ may be made, for example, of glass of the type "Schott F2" having a refractive index $n = 1.625$ and the lens element $L_3$ may be made of glass of the type "Schott SK5" having a refractive index $n = 1.592$.

In FIG. 2 the image side is situated to the left of the drawing. Although in practice the rays propagate from right to left, the radiation path in FIG. 2 is shown from left to right, as is permissible in optical systems of this type.

In addition to the main group $g_2$, the projection lens system comprises a first correction group $g_1$ comprising a single meniscus lens element $L_1$ of polymethyl methacrylate (PMMA) having refractive surfaces $S_1$ and $S_2$. A second field-curvature correction group $g_3$ comprises a single lens element $L_4$ which has a concave refractive surface $S_6$ and which may also be made of PMMA. Instead of PMMA the elements $L_1$ and $L_3$ may be made of polycarbonate. The second surface $S_7$ of the lens element $L_4$ is planar and is positioned against a disc-shaped holder CP. A coolant of water and glycol, flows in this holder. Such a coolant is necessary because the reproduction tube should have a high brightness, without cooling the temperature of the fluorescent material on the faceplate FP of the tube would rise substantially, as a result of which the brightness of the tube could diminish.

Surprisingly, it has been found that a projection-lens system having a sufficiently small focal length and a sufficiently large angle of field and providing adequate correction for aberrations can be achieved with only two aspheric refractive surfaces, instead of more than two as is customary in this type of system. The surfaces $S_3$ and $S_5$ of the main group then need not be made aspheric, so that a time-consuming and expensive process may be dispensed with. The aspheric surfaces are the surfaces $S_1$ and $S_6$, of plastic lens elements $L_1$ and $L_4$. The elements having the aspheric surfaces can be manufactured by means of a moulding or pressing method.

The aspheric surfaces $S_1$ and $S_6$ may be characterized by:

$$Z = \sum_{i=1}^{6} a_{2i} \cdot Y^{2i}$$

where Y is the distance from a point on the aspheric surface to the optical axis of the lens element, and Z is the distance between the projection of this point of the optical axis with the aspheric surface.

A projection lens system in accordance with the invention, in which the elements $L_1$ and $L_4$ are made of PMMA, the element $L_2$ is made of glass type "F2" and the element $L_3$ is made of glass "SK5", which projection-lens system has a numerical aperture N.A. of approximately 0.35 and a focal length F of approximately 85 mm, has axial curvatures C of the lens-surfaces, axial distances d between these surfaces, and refractive indices n with the following values, viewed from the image side:

|  |  | C (mm$^{-1}$) | d (mm) | n |
|---|---|---|---|---|
| $L_1$ | $S_1$ | 0.012411 | | |
|  |  |  | 10.00 | 1.490 |
|  | $S_2$ | 0.011446 | | |
|  |  |  | 15.77 | |
|  | $S_3$ | 0.008615 | | |
| $L_2$ |  |  | 3.00 | 1.625 |
|  | $S_4$ | 0.019000 | | |
| $L_3$ |  |  | 33.40 | 1.592 |
|  | $S_5$ | −0.014471 | | |
|  |  |  | 63.03 | |
|  | $S_6$ | −0.021474 | | |
| $L_4$ |  |  | 3.00 | 1.490 |
|  | $S_7$ | 0.000000 | | | whilst the aspheric coefficients $a_{2i}$ of the two aspheric surfaces $S_1$ and $S_6$ are as follows:

| $S_1$ | $a_2 = 0.620569 \ 10^{-2}$ |
|---|---|
|  | $a_4 = -0.226045 \ 10^{-5}$ |
|  | $a_6 = 0.305348 \ 10^{-8}$ |
|  | $a_8 = 0.467834 \ 10^{-11}$ |
|  | $a_{10} = 0.285971 \ 10^{-14}$ |
|  | $a_{12} = -0.727729 \ 10^{-18}$ |
| $S_6$ | $a_2 = -0.107368 \ 10^{-1}$ |
|  | $a_4 = -0.535898 \ 10^{-5}$ |
|  | $a_6 = 0.497709 \ 10^{-8}$ |
|  | $a_8 = -0.609099 \ 10^{-11}$ |
|  | $a_{10} = 0.363103 \ 10^{-14}$ |
|  | $a_{12} = -0.879444 \ 10^{-18}$ |

The projection-lens system described here is particularly suitable for use in the green channel, which has the widest band, in a colour-television projection system. However, such projection lens systems may also be employed in the blue channel and the red channel of such colour-television projection system.

What is claimed is:

1. A projection-lens system for projecting a magnified image of a scene reproduced by means of a reproduction element onto a projection screen, which lens system comprises, in this order and viewed from the image side, a first group having one aspheric surface, a positive second or main group having two spherical convex outer surface, and a third group comprising a planoconcave lens element whose concave surface which faces the image side is aspheric, the elements of the first group and of the third group being made of transparent plastic, characterized in that the main group provides substantially the entire power of the lens system and comprises a cemented doublet of a convex-concave elment and a biconvex lens element, which elements have substantially equal refractive indices and different dispersions.

2. A projection-lens system as claimed in claim 1, characterized in that the diameters of the consecutive lens elements decrease viewed from the object side.

3. A projection-lens system as claimed in claim 1 or 2, characterized in the focal length F is approximately 85 mm and the numerical aperture N.A. is approximately 0.35, and the axial curvatures C of the lens surfaces, the axial distances d between these surfaces and the refractive indices n have the following values, viewed from the image side:

|  |  | C (mm$^{-1}$) | d (mm) | n |
|---|---|---|---|---|
| L$_1$ | S$_1$ | 0.012411 |  |  |
|  |  |  | 10.00 | 1.490 |
|  | S$_2$ | 0.011446 |  |  |
|  |  |  | 15.77 |  |
| L$_2$ | S$_3$ | 0.008615 |  |  |
|  |  |  | 3.00 | 1.625 |
|  | S$_4$ | 0.019000 |  |  |
| L$_3$ |  |  | 33.40 | 1.592 |
|  | S$_5$ | −0.014471 |  |  |
|  |  |  | 63.03 |  |
| L$_4$ | S$_6$ | −0.021474 |  |  |
|  |  |  | 3.00 | 1.490 |
|  | S$_7$ | 0.000000 |  |  | whilst the aspheric coefficients $a_{2i}$ of the two aspheric surfaces S$_1$ and S$_6$, which may be characterized by:

$$Z = \sum_{i=1}^{6} a_{2i} \cdot Y^{2i}$$

where Y is the distance from a point on the aspheric surface to the optical axis of the lens and Z is the distance between the projection of this point on the optical axis and the intersection of the optical axis with the aspheric surface, are given by:

| | |
|---|---|
| S$_1$ | $a_2 = 0.620569 \ 10^{-2}$ |
|  | $a_4 = 0.226045 \ 10^{-5}$ |
|  | $a_6 = 0.305348 \ 10^{-8}$ |
|  | $a_8 = -0.467834 \ 10^{-11}$ |
|  | $a_{10} = 0.285971 \ 10^{-14}$ |
|  | $a_{12} = -0.727729 \ 10^{-18}$ |
| S$_6$ | $a_2 = -0.107368 \ 10^{-1}$ |
|  | $a_4 = -0.535898 \ 10^{-5}$ |
|  | $a_6 = 0.497709 \ 10^{-8}$ |
|  | $a_8 = -0.609099 \ 10^{-11}$ |
|  | $a_{10} = 0.363103 \ 10^{-14}$ |
|  | $a_{12} = -0.879444 \ 10^{-18}$ |

4. A colour-television projection system comprising three cathode-rays tubes, one for each of the primary colours red, green and blue, a projection screen, and three projection lens systems, which are each arranged between one of the cathode-ray tubes and the projection screen, characterized in that at least the projection-lens system in the radiation path from the green cathode-ray tube is a projection-lens system as claimed in claim 1 or 2.

* * * * *